United States Patent
Friesen

(10) Patent No.: US 6,507,973 B1
(45) Date of Patent: Jan. 21, 2003

(54) HEATED WIPER SYSTEM

(76) Inventor: Harvey Friesen, Box 5042, Morden, Manitoba (CA), R6M 1Y9

( * ) Notice: Subject to any disclaimer, the term of this patent is extended or adjusted under 35 U.S.C. 154(b) by 0 days.

(21) Appl. No.: 09/931,416

(22) Filed: Aug. 17, 2001

(51) Int. Cl.[7] .................................................. B60S 1/38
(52) U.S. Cl. .................. 15/250.06; 219/202; 15/250.05
(58) Field of Search .......................... 15/250.06, 250.07, 15/250.48, 250.05, 250.27, 250.08, 250.09, 250.14; 219/202, 203

(56) References Cited

U.S. PATENT DOCUMENTS

| | | | | |
|---|---|---|---|---|
| 3,428,993 A | * | 2/1969 | Rickett | 15/250.06 |
| 3,639,938 A | * | 2/1972 | Golden | 15/250.06 |
| 3,718,940 A | * | 3/1973 | Bode | 15/250.06 |
| 4,497,083 A | * | 2/1985 | Nielsen et al. | 15/250.06 |
| 4,603,451 A | * | 8/1986 | VanSickle | 15/250.07 |
| 5,513,412 A | * | 5/1996 | Longazel | 15/250.001 |
| 5,572,765 A | * | 11/1996 | Guell | 15/250.06 |
| 5,649,337 A | * | 7/1997 | Lobner | 15/250.06 |
| 6,028,291 A | * | 2/2000 | Heisler | 15/250.07 |
| 6,236,019 B1 | * | 5/2001 | Piccione et al. | 15/250.06 |

FOREIGN PATENT DOCUMENTS

| | | | | |
|---|---|---|---|---|
| CA | 962813 | * | 2/1975 | 15/250.06 |
| JP | 0291252 | * | 12/1986 | 15/250.06 |

* cited by examiner

*Primary Examiner*—Gary K. Graham
(74) *Attorney, Agent, or Firm*—Ryan W. Dupuis; Adrian D. Battison; Michael R. Williams

(57) ABSTRACT

A heated wiper system is provided for mounting on a wiper arm of a windshield wiper assembly of a vehicle. A wiper blade selectively mounts on the free end of the wiper arm having a resilient wiper element arranged to slidably receive a heating element therein. A connector selectively mounts the heating element and an associated thermostat to an electrical supply of the system enabling the thermostat and heating element to be replaced independently of the wiper blade. When more that one wiper blade is provided, the respective heating elements preferably have lengths which correspond to the length of the respective wiper elements within which they are mounted. When the heating elements are of different length, a longest one of the heating elements preferably has a lower electrical resistance per unit length thereof than a shortest one of the heating elements. Total electrical resistances of the respective heating elements may thus be substantially equal.

14 Claims, 2 Drawing Sheets

HEATED WIPER SYSTEM

FIELD OF THE INVENTION

The present invention relates to a heated wiper system for use with the windshield wiper assembly of a vehicle.

BACKGROUND

In colder climates, the build up of ice on vehicle windshield wiper blades is a common problem. The ice causes the wiper blades to operate poorly which is an annoyance to drivers and can become a significant road hazard if the visibility of the driver through the windshield is significantly reduced.

Various wiper heating devices have attempted to overcome the problem of ice build up on wiper blades by mounting a heating element in close proximity to or directly in engagement with the wiper blades. In order for the heating element to operate effectively it is generally required that the heating element directly engage the wiper. Known heating devices however generally mount the heating element integrally within the wiper or wiper blade such that replacement of the wipers requires replacement of the heating element or portions thereof. The periodical replacement of the wipers can thus be expensive and requires time consuming assembly.

U.S. Pat. No. 6,028,291 to Heisler and U.S. Pat. No. 4,497,083 to Nielsen each provide a heated windshield wiper system in which a heater element extends through the resilient wiper element of a wiper blade. In each instance a releasable connector supplies power to the heating element at one end of the resilient wiper element permitting the heating element and wiper element to be replaced without replacement of the entire wiper blade. In the event that the wiper blade requires replacement however considerable rewiring of the heating element is required. Heisler in particular provides a thermostat mounted on the wiper blade in a location requiring replacement of the electrical supply wiring in the event that the thermostat fails and requires replacement.

U.S. Pat. No. 3,408,678 to Linker provides a windshield wiper assembly in which a heating element extends along the resilient wiper element. The electrical supply wiring to the heating element includes selective couplings at a location where the wiper blade mounts on a supporting wiper arm such that the entire blade including the heating element can be replaced. The heating element and selectively coupling in this instance however are required to be formed integrally with the wiper blade and therefore do not permit independent replacement of the various components of the wiper assembly.

SUMMARY

According to one aspect of the present invention there is provided a heated wiper system for mounting on a wiper arm of a wiper assembly of a vehicle, the system comprising:

a wiper blade arranged to be selectively mounted on a free end of the wiper arm, the wiper blade including a resilient wiper element having a passage extending through the wiper element in a longitudinal direction of the wiper element from an opening at one end of the wiper element;

a heating element arranged to be received within the passage extending through the wiper element;

an electrical supply arranged to supply electrical power to the heating element;

a thermostatic sensor arranged to activate the heating element in response to a prescribed temperature condition; and a selective connector arranged to selectively connect the heating element to the electrical supply;

the thermostatic sensor being coupled between the heating element and the selective connector so as to be selectively separable from the electrical supply with the heating element upon releasing the selective connector.

The particular arrangement wherein the thermostatic sensor is provided on the wiper blade between the selective connector to the electrical power supply and the heating element permits the thermostatic sensor and the heating element to be replaced together if required without the need to replace wiring of the electrical supply. Permitting the heating element to be slidably removed from the wiper element and selectively mounting the thermostatic sensor can be arranged to permit independent replacement thereof. The selective connectors located between the wiper blade and the electrical supply of the system enables the system to be assembled as a kit of parts permitting wipers of different length to be readily assembled within the same kit. This is particularly useful in accommodating many newer conventional automobiles in which the windshield wipers of the left and right sides of the vehicle are commonly of different lengths.

The heating element is preferably slidably mounted within the passageway with the thermostatic sensor being selectively mounted on the wiper blade such that the heating element and the thermostatic sensor are arranged to be selectively separable from the wiper blade upon release of the selective connector.

The selective connector is preferably arranged to be located adjacent the free end of the wiper arm when the wiper blade is mounted on the wiper arm with the selective connector being arranged to be released independently of the wiper blade from the wiper arm.

The connector is preferably arranged to be movable between a connected position in which the heating element and the thermostatic sensor are coupled to the electrical supply and a released position in which the heating element and the thermostatic sensor are released from the electrical supply for replacement thereof.

The resilient wiper element is formed of silicone rubber so as to resist damage from excessive heat produced by the heating element.

In a wiper assembly having two wiper arms, the system preferably comprises two wiper blades arranged to be mounted on the wiper arms respectively, each having a wiper element with a heating element mounted therein, the heating elements having a length which corresponds to the length of the respective wiper element regardless of the wiper elements being different in length.

When the heating elements are of different length, a longest one of the heating elements preferably has a lower electrical resistance per unit length thereof than a shortest one of the heating elements. Total electrical resistances of the respective two heating elements may thus be substantially equal.

According to a second aspect of the present invention there is provided a heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

an electrical supply arranged to supply electrical power to the heating elements;

a thermostatic sensor associated with each heating element and being arranged to activate the associated heating element in response to a prescribed temperature condition; and a selective connector arranged to selectively connect each heating element to the electrical supply;

the heating elements having different lengths corresponding to different lengths of the wiper elements.

Each heating element preferably extends through the respective wiper element substantially a full length of the wiper element.

BRIEF DESCRIPTION OF THE DRAWINGS

In the accompanying drawings, which illustrate an exemplary embodiment of the present invention.

DETAILED DESCRIPTION

Figure 1:
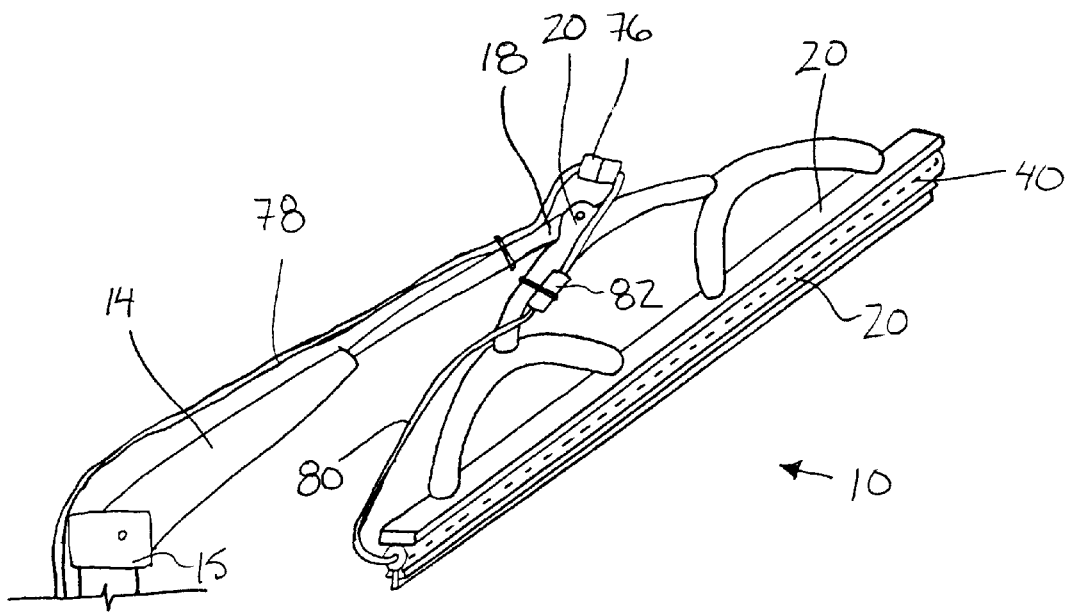
FIG. 1 is an isometric view of one wiper blade of the heated wiper system.

Referring to the accompanying drawings, there is illustrated a wiper assembly generally indicated by reference numeral 10 having a wiper heating system 12 mounted thereon. The wiper heating system 12 is arranged to heat the wiper assembly 10 so as to prevent the build up of ice thereon when in use in colder climates.

The wiper assembly 10 includes a wiper arm 14 which is pivotally mounted at its base 15 as in a conventional vehicle wiper blade assembly. A tension spring is mounted at the base 15 of the arm so as to bias the arm against the windshield of a vehicle having the assembly mounted thereon. An articulation joint is mounted at a free end 18 of the arm for pivotally and selectively mounting a wiper blade 20 thereon. The wiper blade 20 includes a longitudinally extending wiper receiving channel 22 for mounting a wiper element 24 therein.

The wiper heating system 12 includes the wiper element 24 in the form of an elongate resilient member formed of silicone rubber. The wiper element 24 includes a mounting portion 26 extending longitudinally along an inner side of the element. The mounting portion is a T-shaped flange similar to conventional wiper elements for mounting the wiper element within the channel 22 of the wiper blade. The wiper element 24 further includes a tubular portion 28 extending in the longitudinal direction of the wiper along the mounting portion 26.

A wiping portion 30 extends longitudinally along an outer side of the wiper element for engaging the vehicle windshield. The wiping portion includes a primary lip 32 in the form of a radially extending flange as well as a pair of shorter secondary lips 34 located on each side of the primary lip 32 and extending radially outward from the tubular portion as well.

An axially extending passage 36 extends through the tubular portion of the wiper element in the longitudinal direction of the wiper between openings 38 located at respective ends of the wiper element. The passage 36 is spaced between the respective inner and outer sides of the wiper element.

A heating element 40 is slidably mounted within the passage 36 and is arranged to extend the full length of the wiper element. The heating element 40 comprises a tubular member of flexible plastic having a longitudinally extending insulated plastic divider 42 mounted therein defining a pair of wire receiving channels 44 extending longitudinally through the heating element. A conductive heating wire 46 is mounted within the channels 44 in a U-shaped pattern such that a portion of the wire extends longitudinally through each channel. The longitudinally extending portions of wire 46 are coupled together at a wrapped end 48 and define a pair of free ends 50 opposite the wrapped end. The tubular plastic member of the heating element protects the conductive heating wire therein from the elements. The conductive heating wire has an appropriate resistance so as to dispense heat therefrom when electricity is passed therethrough.

A pair of insulated electrical supply leads 52 are coupled to the free ends 50 of the conductive wire to provide an electrical current therethrough. A sealed resilient sleeve 54 is wrapped about an end of the heating element 40 having the free ends 50 of the conducting wire therein and extends over the electrical supply leads 52 so as to seal the wires therein and protect them from the elements.

The resilient material of the wiper element 24 is arranged to deform about the heating element 40 when the heating element is slidably mounted therein so as to secure the heating element therein by snugly engaging respective sides of the element. Both the heating element 40 and the passage 36 have a circular cross section so as to snugly receive the heating element within the passage without requiring additional mounting means to secure the heating element therein.

The resilient nature of the wiper element 24 allows the heating element 40 to remain selectively slidable in a longitudinal direction within the passage 36 so as to be selectively separable from the wiper element by sliding the heating element through one of the elements 38 located at respective ends of the passage. In this arrangement, the wiper blade 20 or the wiper element 24 can be independently replaced without replacing the heating element 40.

In order to replace the wiper element 24, should the wiper element become damaged, the heating element 40 is first slidably removed therefrom. The wiper element 24 may then be replaced such that the heating element 40 may be subsequently slidably received within the passage 36 of the replacement wiper element.

Figure 2:
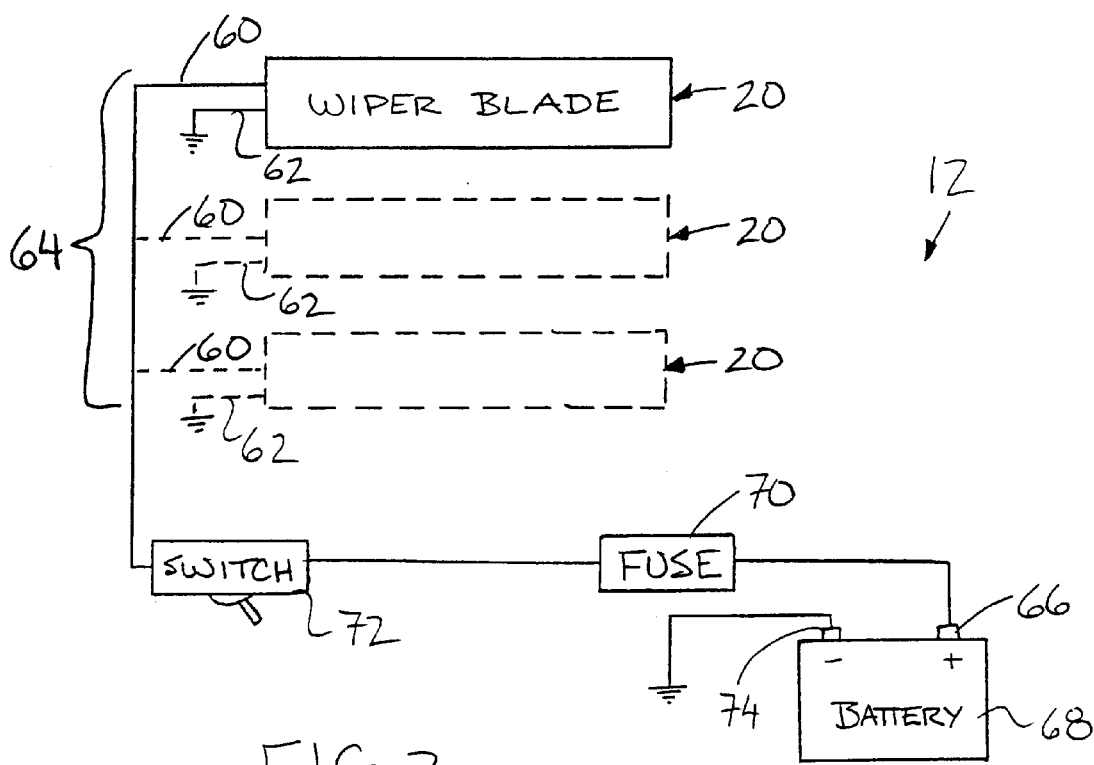
FIG. 2 is a schematic view of the heated wiper system.
Figure 3:
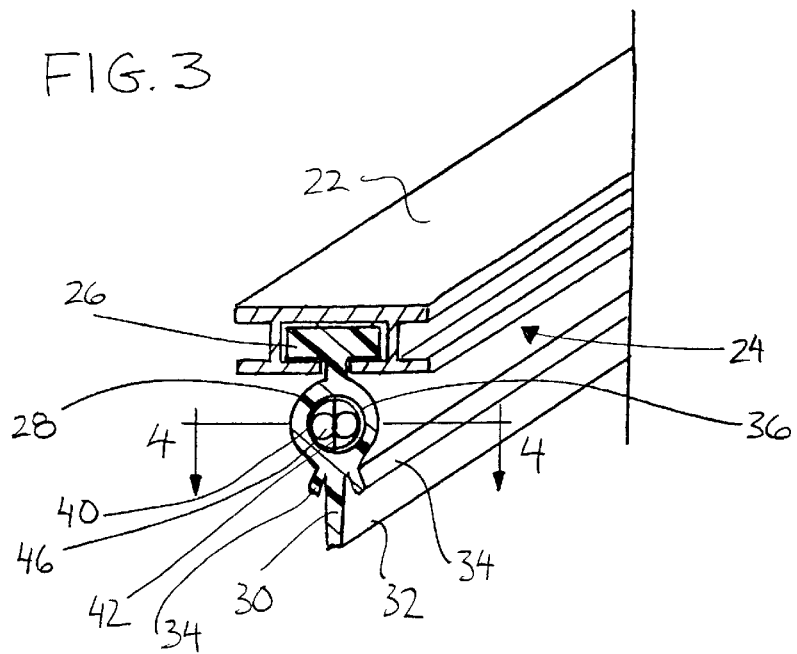
FIG. 3 is a partly sectional perspective view showing the heating element extending through the wiper element of a wiper blade according to the heated wiper system of FIG. 2.
Figure 4:
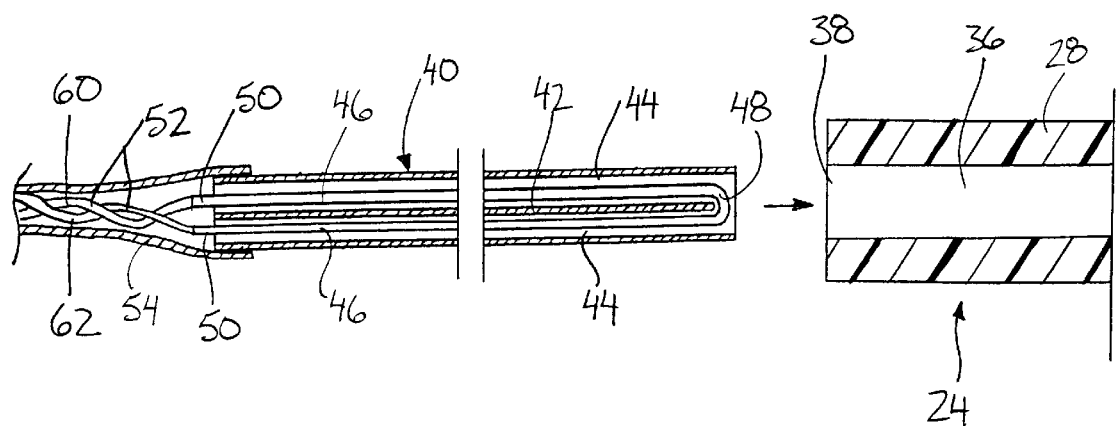
FIG. 4 is a sectional side elevational view of a heating element shown slidably removed from a respective wiper element.

The electrical supply leads 52 for each heating element 40 when multiple wiper blades are provided include a positive lead 60 and a ground 62 as shown in FIG. 2. The positive leads 60 for all of the heating elements are joined at a common terminal otherwise known as a bus 64. Any number of wiper blades can be connected to the bus 64 as shown in dotted line in FIG. 2. The bus 64 is connected to the positive terminal 66 of a battery 68 of the vehicle upon which the wiper heating system 12 is mounted.

An inline fuse 70 and a control switch 72 are coupled in series between the bus 64 and the battery 68. The inline fuse 70 protects the electrical components of the wiper heating system 12 from electrical damage. The control switch 72 is mounted within an interior space of the vehicle within reach of the operator so as to be located remotely from the heating elements on the wiper blades. The negative terminal 74 of the battery is also connected to the ground similarly to the ground leads 62 of the respective heating elements.

The electrical supply leads 52 leading to each heating element 40 when plural wiper blades are provided, includes a selective connector 76 which permits the heating element to be released from the wiring connecting the heating element to the bus 64. The selective connector 76 is located adjacent the free end 18 of the wiper arm adjacent the articulation joint which mounts the wiper blade on the respective wiper arm. Each pair of electrical supply leads 52 thus includes a first portion 78 extending along the wiper arm from the free end 18 of the arm to the bus 64 of the system and a second portion 80 which is connected from the free end of the wiper arm to one end of the wiper element where the end of the respective heating element 40 is connected thereto. The selective connector 76 is thus movable between a connected position in which the first and second portions are coupled so as to connect the heating element 40 with the bus 64 and a released position in which the first and second portions of the electrical supply leads are separated so as to permit the heating element 40 to be released from the wiper blade by slidably removing it from the passage 36.

A thermostatic sensor 82 is coupled in series with the second portion 80 of each pair of electrical supply leads 52 for controlling activation of a respective one of the heating elements associated therewith. The sensor 82 is arranged to activate the respective heating element of the associated wiper blade 20 based upon a prescribed temperature condition in which ambient temperature falls below a prescribed temperature, for example the freezing point of water. The thermostatic sensor 82 is coupled between the heating element 40 and the respective selective connector 76 of the wiper blade. A strap mount selectively mounts the thermostatic sensor 82 on the wiper blade 20 so as to permit the sensor to be readily removed and replaced therefrom. Releasing the connector 76 thus permits the thermostatic sensor 82 to be replaced with the heating element if required.

By positioning the selective connector 76 adjacent the free end of the arm and permitting the connector to operate between respective released and connected positions while the thermostatic sensor is selectively mounted on the wiper blade and the heating element is slidably removable from the respective wiper element, an individual is able to replace the wiper element, the wiper blade or the thermostat and heating element all independently of one another.

When multiple blades are required having wiper elements of different length the wiper heating system 12 includes heating elements 40 which also are of different lengths. The length of each heating element is dependent upon the length of the corresponding wiper element upon which it is mounted so that each heating element extends the full length of the respective wiper elements. The total electrical resistance of the respective heating elements in such a system are all arranged to be equal to one another to generate a consistent amount of heat along the length of each wiper element in use. This is accomplished by ensuring that the longer the heating element between respective ends thereof the less electrical resistance per unit length it has. The longest one of the heating elements will thus have a lower electrical resistance per unit length than any of the shorter heating elements.

The positioning of the selective connectors 76 at the free end of the respective wiper arms enables a kit to be provided in which an individual purchases a wiring harness of the system including the bus 64, the fuse 70 and the switch 72 for connection to the battery of a vehicle. An individual then selects whichever length wiper blades are appropriate for their respective vehicle as well as however many wiper blades are required and then connects all of the positive leads 60 thereof to the bus 64 of the system. This ensures that the person will have heating elements of appropriate length and appropriate resistance to provide uniform heating of the wiper elements across their full length regardless of how many wiper blades or of what size wiper blades are required. If required, the wiper blade or just the wiper element or the thermostat and heating element may all be replaced independently of one another should damage to any particular component occur without the need to be replacing the remaining components.

Due to the required periodic maintenance and replacement of wiper components, the use of the wiper blade assembly and wiper heating assembly of the present invention provides a significant savings in cost and time as the heating element 40 does not require replacement or reconnecting once it has been initially installed when only the wiper element or wiper blade is damaged. Also, the wiper blade or the heating element thermostatic sensor can be replaced independently of one another should one of them become defective without the need to replace the remaining components.

While one embodiment of the present invention has been described in the foregoing, it is to be understood that other embodiments are possible within the scope of the invention. The invention is to be considered limited solely by the scope of the appended claims.

What is claimed is:

1. A heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

an electrical supply arranged to supply electrical power to the heating elements;

a thermostatic sensor associated with each heating element and being arranged to activate the associated heating element in response to a prescribed temperature condition;

a selective connector arranged to selectively connect the heating element to the electrical supply;

the thermostatic sensor being coupled between the heating element and the selective connector so as to be selectively separable from the electrical supply with the heating element upon releasing the selective connector; and the heating elements being different in length wherein a longest one of the heating elements has a lower electrical resistance per unit length thereof than a shortest one of the heating elements.

2. The system according to claim 1 wherein the heating elements are slidably mounted within the respective passageways.

3. The system according to claim 1 wherein the thermostatic sensors are selectively mounted on the respective wiper blades.

4. The system according to claim 1 wherein each heating element is slidably mounted within the respective passageway and each thermostatic sensor is selectively mounted on the respective wiper blade, each heating element and respective thermostatic sensor being arranged to be selectively separable from the respective wiper blade upon release of the respective selective connector.

5. The system according to claim 1 wherein each selective connector is arranged to be located adjacent the free end of the respective wiper arm when the wiper blade is mounted on the wiper arm.

6. The system according to claim 1 wherein each selective connector is arranged to be located adjacent the free end of the respective wiper arm when the wiper blade is mounted on the wiper arm and wherein each selective connector is arranged to be released independently of the respective wiper blade from the wiper arm.

7. The system according to claim 1 wherein each connector is movable between a connected position in which the respective heating element and the respective thermostatic sensor are coupled to the electrical supply and a released position in which the respective heating element and the respective thermostatic sensor are released from the electrical supply for replacement thereof.

8. The system according to claim 1 wherein each resilient wiper element is formed of silicone rubber.

9. The system according to claim 1 for a wiper assembly having two wiper arms, the system comprising two wiper blades arranged to be mounted on the wiper arms respectively, each having a wiper element with a heating element mounted therein.

10. The system according to claim 1 wherein total electrical resistances of the respective two heating elements are substantially equal.

11. A heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

an electrical supply arranged to supply electrical power to the heating elements;

a thermostatic sensor associated with each heating element and being arranged to activate the associated heating element in response to a prescribed temperature condition; and a selective connector arranged to selectively connect each heating element to the electrical supply;

the heating elements having different lengths corresponding to different lengths of the wiper elements;

wherein a longest one of the heating elements has a lower electrical resistance per unit length thereof than a shortest one of the heating elements.

12. The system according to claim 11 wherein each heating element extends through the respective wiper element substantially a full length of said wiper element.

13. The system according to claim 11 wherein each thermostatic sensor is coupled between the respective selective connector and the respective heating element so as to be selectively separable from the electrical supply with the respective heating element upon releasing the respective selective connector.

14. A heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

an electrical supply arranged to supply electrical power to the heating elements;

a thermostatic sensor associated with each heating element and being arranged to activate the associated heating element in response to a prescribed temperature condition; and a selective connector arranged to selectively connect each heating element to the electrical supply;

the heating elements having different lengths corresponding to different lengths of the wiper elements;

wherein a longest one of the heating elements has a lower electrical resistance per unit length thereof than a shortest one of the heating elements and total electrical resistances of the respective heating elements are substantially equal.

* * * * *